Oct. 22, 1929.  E. HOFFMANN  1,732,603
SIGNALING DEVICE FOR AUTOMOBILES
Filed Aug. 22, 1927
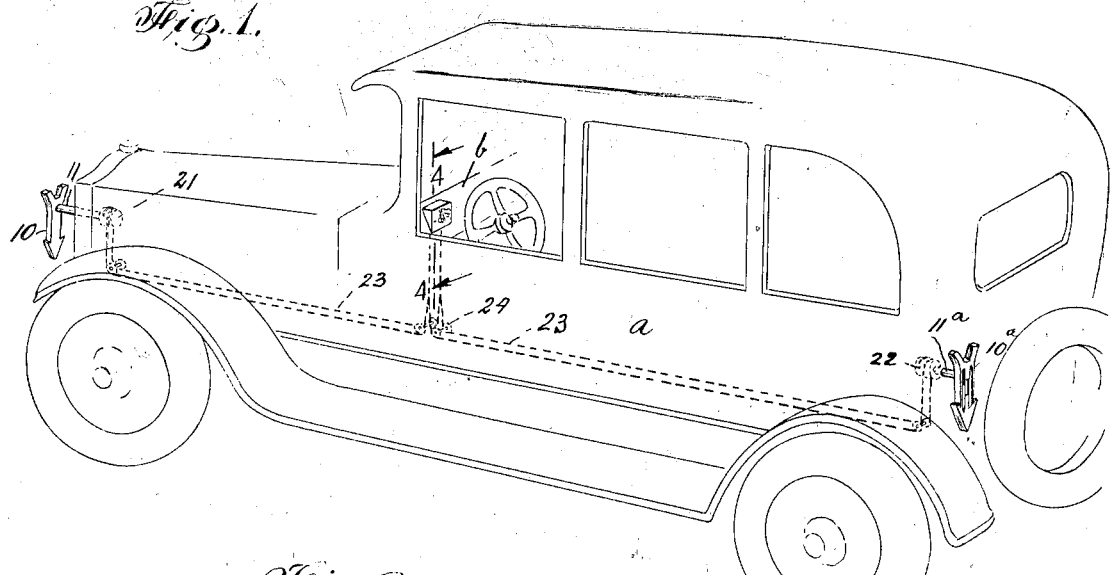
Fig. 1.
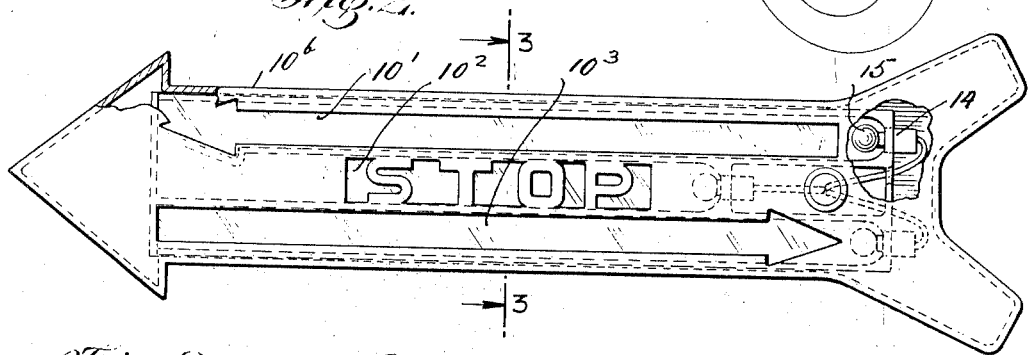
Fig. 2.
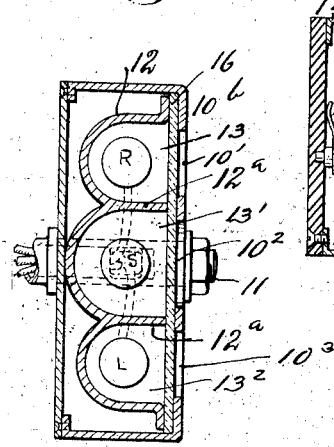
Fig. 3.
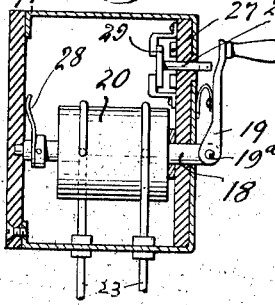
Fig. 4.
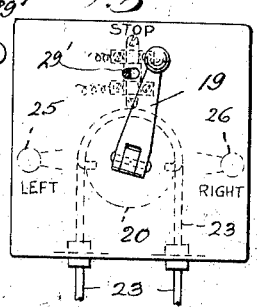
Fig. 5.
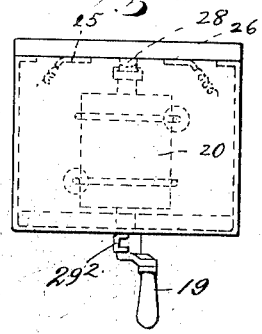
Fig. 6.
Fig. 7.
INVENTOR
Erich Hoffmann
BY
Max K. Ordmann
ATTORNEY Patented Oct. 22, 1929

1,732,603

UNITED STATES PATENT OFFICE

ERICH HOFFMANN, OF NEW YORK, N. Y.

SIGNALING DEVICE FOR AUTOMOBILES

Application filed August 22, 1927. Serial No. 214,599.

This invention relates to signaling devices for automobiles and has for its main object to provide a signaling device which will indicate in the daytime or at night in an effective manner the direction the vehicle is about to travel or that it is about to stop.

Another object is to provide such signaling device at the front and rear of the vehicle, both operable simultaneously from the driver's seat.

A still further object is to provide a signaling device in form of a movable indicator divided in separately illuminable compartments, each having a window whereby at night the position of the indicator will be made visible.

With these and other objects in view my invention consists in the novel construction, arrangement and combination of parts as will be more fully described and defined in the appended claim.

My invention will be more fully understood by reference to the accompanying drawing in which similar reference characters denote corresponding parts and in which Fig. 1 is a perspective view of an automobile equipped with my new signaling device; Fig. 2 is a front view partly in section of an indicator forming part of my device; Fig. 3 is a cross section on line 3—3 of Fig. 2; Fig. 4 is a vertical section of the indicator operating means; Fig. 5 is a front view thereof; Fig. 6 a top plan view of said means and Fig. 7 a diagram of the electric illuminating system.

In the drawing $a$ denotes a motor vehicle, 10, $10^a$ denote the indicators in front and rear of the vehicle and 11 the operating means for said indicators arranged at a suitable place in front of the driver's seat, as for instance on the dash board $b$.

The indicators 10, $10^a$ are fixed to spindles 11, $11^a$ respectively turnably supported in suitable bearings and adapted to be operated from the driver's seat. Each indicator is provided with illuminating means so that the direction into which the vehicle is about to turn or that it is about to stop will be made visible. In the present example each indicator is made in form of an arm $10^b$, preferably arrow shaped, which may have a casing 12 fixed to its rear face. Said casing 12 is divided by longitudinal partitions $12^a$ into separate compartments 13, $13'$, $13^2$ closed at their ends and one of the end walls of each compartment is provided with a socket 14 for an electric bulb 15, so that each compartment may be illuminated separately. Each indicator is longitudinally recessed as at $10'$, $10^2$, $10^3$ to form windows for the different compartments which may be covered by glass pane 16 or other transparency. Two of the recesses, such as $10'$, and $10^3$ may be arrow shaped pointing in opposite directions, while the third one as $10^2$ may be of rectangular shape and the word "stop" may be printed on the transparency covering said recess.

The means for operating these indicators according to the present example comprises a box 17 or the like fixed to the dash board or other stationary part in front of the driver's seat, and in which is rotatably mounted a horizontal spindle 18. The front end of said spindle carries a crank arm or handle 19. For the transmission of rotation of said spindle to the spindles 11, $11^a$ of the indicators 10, $10^a$ I provide drums 20, 21, 22, fixed on the spindles 18, 11, $11^a$ respectively which are attached and over which wind on and off cords 23, or the like guided over sheaves 24. For controlling the illumination of the different compartments according to the position of the indicator arm, I provide an electric switch in the electric circuits running from the battery B through the different bulbs. The switch comprises contacts 25, $25^a$ and 26, $26^a$ for the left and right positions of the indicators and contact 27 for the "stop" position of the indicators arranged within the box 17. Carried by the inner end of the spindle 18 is a resilient contact member 28 which according to the direction of rotation of the spindle will be brought into contact either with one or the other of the contacts 25, 26 which may be fixed on the inner face of the rear wall of said box 17. The contact member adapted to cooperate with contacts $25^a$, $26^a$ and 27 is in form of a transversely movable plunger 29 whose stem $29'$ projects outwardly through said wall and is guided therein. The outwardly projecting end of said plunger may be formed with a catch 29² (Fig. 6). The crank arm 19 is resiliently supported on spindle 18 as at 19ª so that it can be swung toward the box to engage said catch 29² when the arm is moved into the "stop" position. Owing to its resiliency and its tendency to swing away from the box the arm 19 will move the plunger 29 forwardly breaking the circuit through contacts 25ª, 26ª and closing the circuit through contact 27 illuminating thereby the "stop" signal of the compartment 10².

What I claim is:—

In a signaling device for vehicles, an arrow shaped hollow indicator arm, formed interiorly with three separate compartments extending longitudinally in the body of said arm, the front face of said arm formed with three transparencies forming windows for said separate compartments, the two outer of said transparencies being also arrow shaped in opposite directions to each other and the central transparency bearing the sign "stop", sockets in said compartments for electric bulbs and means for rotatively attaching said indicator arm to a vehicle.

In testimony whereof I affix my signature.

ERICH HOFFMANN.